United States Patent
Ayabe et al.

(10) Patent No.: US 9,376,550 B2
(45) Date of Patent: Jun. 28, 2016

(54) MIXED PELLET

(71) Applicant: ADEKA CORPORATION, Tokyo (JP)

(72) Inventors: Takashi Ayabe, Saitama (JP); Kenji Yamashita, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 14/413,959

(22) PCT Filed: Jul. 3, 2013

(86) PCT No.: PCT/JP2013/068298
§ 371 (c)(1),
(2) Date: Jan. 9, 2015

(87) PCT Pub. No.: WO2014/010492
PCT Pub. Date: Jan. 16, 2014

(65) Prior Publication Data
US 2015/0158996 A1    Jun. 11, 2015

(30) Foreign Application Priority Data
Jul. 10, 2012   (JP) .................................. 2012-154504

(51) Int. Cl.
| | |
|---|---|
| *C08K 5/34* | (2006.01) |
| *C08K 5/521* | (2006.01) |
| *C08K 5/3435* | (2006.01) |
| *C08L 23/12* | (2006.01) |
| *C08J 3/22* | (2006.01) |
| *C08K 5/134* | (2006.01) |
| *C08K 5/13* | (2006.01) |
| *C08L 23/00* | (2006.01) |
| *C08K 5/105* | (2006.01) |
| *C08K 5/527* | (2006.01) |
| *C08K 9/08* | (2006.01) |

(52) U.S. Cl.
CPC . *C08K 5/521* (2013.01); *C08J 3/22* (2013.01); *C08J 3/226* (2013.01); *C08K 5/105* (2013.01); *C08K 5/13* (2013.01); *C08K 5/1345* (2013.01); *C08K 5/3435* (2013.01); *C08L 23/00* (2013.01); *C08L 23/12* (2013.01); *C08J 2323/02* (2013.01); *C08J 2423/02* (2013.01); *C08K 5/527* (2013.01); *C08K 9/08* (2013.01)

(58) Field of Classification Search
CPC ....... C08K 5/521; C08K 5/3435; C08K 5/105
USPC .......................................................... 524/99
See application file for complete search history.

(56) References Cited

U.S. PATENT DOCUMENTS

| | | | |
|---|---|---|---|
| 2010/0298473 A1 | 11/2010 | Yokota et al. | |
| 2013/0065994 A1* | 3/2013 | Yokota | C08J 3/226 524/99 |
| 2014/0378586 A1 | 12/2014 | Ayabe et al. | |

FOREIGN PATENT DOCUMENTS

| | | |
|---|---|---|
| EP | 2 223 960 A1 | 9/2010 |
| EP | 2 810 976 A1 | 12/2014 |
| EP | 2 980 129 A1 | 2/2016 |
| JP | 10-195258 A | 7/1998 |
| JP | 2000-159940 A | 6/2000 |
| JP | 2001-302852 A | 10/2001 |
| JP | 2006-342257 A | 12/2006 |
| JP | 2007-186687 A | 7/2007 |
| JP | 2008-189822 A | 8/2008 |
| JP | 2009-144108 A | 7/2009 |
| JP | 4462867 B2 | 5/2010 |

(Continued)

OTHER PUBLICATIONS

International Search Report, issued in PCT/JP2013/068298, dated Oct. 1, 2013.

(Continued)

*Primary Examiner* — Hui Chin
(74) *Attorney, Agent, or Firm* — Birch, Stewart, Kolasch & Birch, LLP

(57) ABSTRACT

Provided is a masterbatch in which blocking in a masterbatch of a hindered amine compound and a benzoate compound, which is caused by long-term storage under a high-temperature environment, is improved. Also provided is a mixed pellet comprising a mixture of (A) a masterbatch pellet that comprises not less than 30 parts by mass of a hindered amine compound represented by the following Formula (1) with respect to 100 parts by mass of a polyolefin resin and (B) a masterbatch pellet that comprises not less than 30 parts by mass of a benzoate compound represented by the following Formula (2) with respect to 100 parts by mass of a polyolefin, the mixed pellet wherein not less than 70% by mass thereof as a whole is composed of the masterbatch pellets of (A) and (B):

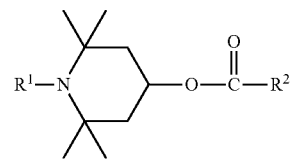

(1)

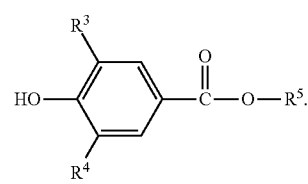

(2)

10 Claims, No Drawings

(56) References Cited

FOREIGN PATENT DOCUMENTS

| JP | 4530327 B2 | 8/2010 |
| JP | 2011-190345 A | 9/2011 |
| WO | WO 2011/148868 A1 | 12/2011 |

OTHER PUBLICATIONS

European Search Report dated Feb. 18, 2016 for European Patent Application No. 13817266.3.

* cited by examiner

MIXED PELLET

TECHNICAL FIELD

The present invention relates to a mixed pellet. More particularly, the present invention relates to a mixed pellet showing excellent blocking resistance which is obtained by separately producing a masterbatch of a hindered amine compound and a masterbatch of a benzoate compound and mixing the masterbatches.

BACKGROUND ART

Since polyolefin resins are degraded by light and thus cannot withstand long-term use, they are commonly used after being stabilized with an ultraviolet absorber and/or a hindered amine compound.

It is known that excellent weather resistance can be attained by combining a hindered amine compound and a benzoate compound and, for example, in Patent Documents 1 to 7, such a combination is shown to impart excellent weather resistance to automobile materials, fiber materials and agricultural films. In addition, it is also known to prepare a masterbatch of a hindered amine compound or ultraviolet absorber and to add the masterbatch to a polyolefin resin. For example, Patent Document 8 discloses a masterbatch in which a hindered amine compound having a melting point of 80° C. or lower is incorporated at a high concentration.

RELATED ART DOCUMENTS

Patent Documents

Patent Document 1: Japanese Patent No. 4462867
Patent Document 2: Japanese Patent No. 4530327
Patent Document 3: Japanese Unexamined Patent Application Publication No. 2006-342257
Patent Document 4: Japanese Unexamined Patent Application Publication No. 2009-144108
Patent Document 5: Japanese Unexamined Patent Application Publication No. H10-195258
Patent Document 6: Japanese Unexamined Patent Application Publication No. 2001-302852
Patent Document 7: Japanese Unexamined Patent Application Publication No. 2000-159940
Patent Document 8: Japanese Unexamined Patent Application Publication No. 2008-189822

However, when a masterbatch containing a hindered amine compound obtained by a reaction between 2,2,6,6-tetramethyl piperidinol and a fatty acid at a high concentration is stored for an extended period under a high-temperature environment, there is a problem that the hindered amine compound exudes to the surface to make the surface of the resulting pellet sticky and cause blocking. Particularly, this problem is pronounced in a masterbatch containing a combination of a hindered amine compound and a benzoate compound, and an improvement is thus required.

SUMMARY OF THE INVENTION

Problems to be Solved by the Invention

Therefore, an object of the present invention is to provide a masterbatch in which the above-described problem is solved and blocking in a masterbatch containing a hindered amine compound and a benzoate compound, which is caused by long-term storage under a high-temperature environment, is improved.

Means for Solving the Problems

In view of the above-described circumstances, the present inventors intensively studied to discover that such blocking under a high temperature environment (40° C. or higher) can be inhibited in a mixed pellet obtained by separately producing a masterbatch of a hindered amine compound and a masterbatch of a benzoate compound and then mixing the masterbatches, thereby completing the present invention.

That is, the mixed pellet of the present invention is a mixed pellet comprising a mixture of (A) a masterbatch pellet that comprises not less than 30 parts by mass of a hindered amine compound represented by the following Formula (1) with respect to 100 parts by mass of a polyolefin resin and (B) a masterbatch pellet that comprises not less than 30 parts by mass of a benzoate compound represented by the following Formula (2) with respect to 100 parts by mass of a polyolefin, the mixed pellet wherein not less than 70% by mass thereof as a whole is composed of the masterbatch pellets of (A) and (B):

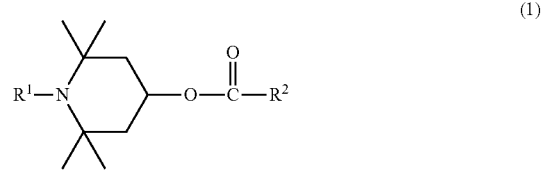

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms or an alkenyl group having 2 to 30 carbon atoms)

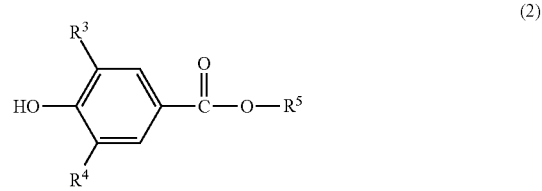

(wherein, $R^3$ and $R^4$ each independently represent a hydrogen atom, an alkyl group having 1 to 12 carbon atoms, or an arylalkyl group having 7 to 30 carbon atoms; and $R^5$ represents an alkyl group having 1 to 30 carbon atoms).

In the mixed pellet of the present invention, it is preferred that the content of the above-described hindered amine compound and benzoate compound be 30 to 60% by mass with respect to the whole mixed pellet.

In the mixed pellet of the present invention, it is also preferred that one or both of the above-described masterbatch pellets of (A) and (B) comprise at least one aromatic metal phosphate represented by the following Formula (3) and that the content of the aromatic metal phosphate(s) in each of the masterbatch pellets of (A) and (B) is 0.3 to 5 parts by mass with respect to 100 parts by mass of the polyolefin resin:

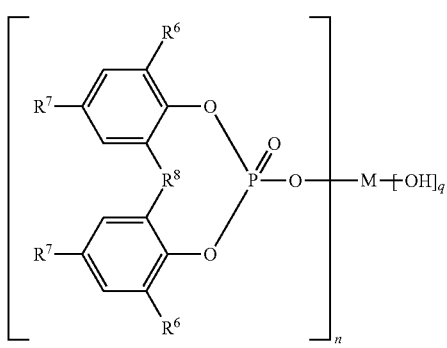

(wherein, $R^6$ represents an alkyl group having 4 to 8 carbon atoms; $R^7$ represents a hydrogen atom or an alkyl group having 1 to 8 carbon atoms; $R^8$ represents an alkylidene group having 1 to 4 carbon atoms; M represents an alkali metal, an alkaline earth metal or aluminum; when M is an alkali metal, n is 1 and q is 0; when M is an alkaline earth metal, n is 2 and q is 0; and, when M is aluminum, n is 1 or 2 and q represents (3-n)).

The polyolefin resin composition of the present invention comprises the above-described mixed pellet of the present invention in a polyolefin resin.

The molded article of the present invention is obtained by molding the above-described polyolefin resin composition.

Effects of the Invention

According to the present invention, a mixed pellet of masterbatches that shows excellent blocking resistance even after a long-term storage under a high-temperature environment (40° C. or higher) can be obtained.

MODE FOR CARRYING OUT THE INVENTION

The mixed pellet of the present invention will now be described in detail.

As the polyolefin resin to be used in the present invention, any polyolefin can be employed without any particular restriction, and examples thereof include α-olefin homopolymers and copolymers, such as polypropylenes, low-density polyethylenes, linear low-density polyethylenes, high-density polyethylenes, polybutene-1, poly-3-methylpentene, poly-4-methylpentene and ethylene-propylene copolymers.

The hindered amine compound used in the present invention is a compound represented by the above-described Formula (1). Examples of the alkyl group having 1 to 30 carbon atoms which is represented by $R^1$ and $R^2$ in the Formula (1) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl and octadecyl. $R^1$ and $R^2$ may be the same or different from each other in the present invention, the compound represented by the Formula (1) is preferably a mixture of compounds in which $R^2$ is an alkyl group having 8 to 26 carbon atoms.

Examples of the hydroxyalkyl group having 1 to 30 carbon atoms which is represented by $R^1$ in the Formula (1) include the above-described alkyl groups that are substituted with a hydroxy group, such as hydroxyethyl, 2-hydroxypropyl and 3-hydroxypropyl.

Examples of the alkoxy group having 1 to 30 carbon atoms which is represented by $R^1$ in the Formula (1) include those alkoxy groups that correspond to the above-described alkyl groups, such as methoxy, ethoxy, propoxy, isopropoxy, butoxy, octoxy and 2-ethylhexyloxy.

Examples of the hydroxyalkoxy group having 1 to 30 carbon atoms which is represented by $R^1$ in the Formula (1) include the above-described alkoxy groups that are substituted with a hydroxyl group, such as hydroxyethyloxy, 2-hydroxypropyloxy, 3-hydroxypropyloxy, 4-hydroxybutyloxy, 2-hydroxy-2-methylpropyloxy and 6-hydroxyhexyloxy.

Examples of the alkenyl group having 2 to 30 carbon atoms which is represented by $R^2$ in the Formula (1) include vinyl, propenyl, butenyl, hexenyl and oleyl. The double bond may be located internally or at the α- or ω-position.

Specific examples of the compound represented by the Formula (1) that can be used in the present invention include the following Compounds 1-1 to 1-7. However, the present invention is not restricted thereto by any means.

Compound 1-1
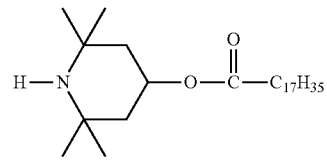

Compound 1-2
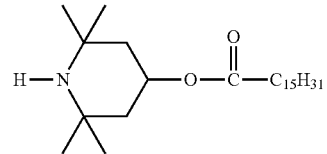

Compound 1-3
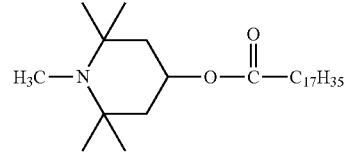

Compound 1-4
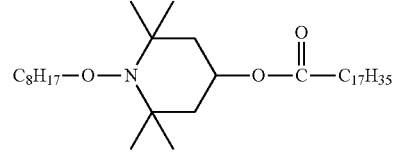

Compound 1-5
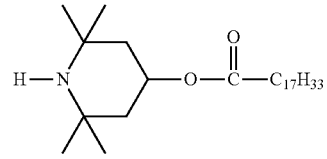

Compound 1-6
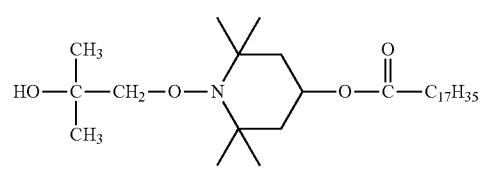

Compound 1-7

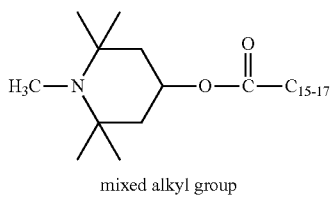

mixed alkyl group

The method of synthesizing the compound represented by the Formula (1) is not particularly restricted, and the compound can be synthesized by any method that is used in ordinary organic synthesis. Examples of such method include direct esterification between an acid and an alcohol, a reaction between an acid halide and an alcohol, and esterification by a transesterification reaction. As a purification method, for example, distillation, recrystallization, or a method utilizing a filtering material and/or an absorbent can be employed as appropriate.

In the present invention, the masterbatch pellet of (A) comprises the hindered amine compound represented by the Formula (1) in an amount of not less than 30 parts by mass, preferably 30 to 300 parts by mass, with respect to 100 parts by mass of the polyolefin resin.

Examples of the alkyl group having 1 to 12 carbon atoms which is represented by the $R^3$ and $R^4$ in the benzoate compound which is represented by the above-described Formula (2) include methyl, ethyl, propyl, isopropyl, butyl, sec-butyl, tert-butyl, pentyl, tert-pentyl, hexyl, heptyl, octyl and cycloalkyl groups such as cyclopentyl and cyclohexyl. Examples of the arylalkyl group having 7 to 30 carbon atoms which is represented by the $R^3$ and $R^4$ include benzyl, phenylethyl and 1-methyl-1-phenylethyl. $R^3$ and $R^4$ may be the same or different from each other.

The alkyl group having 1 to 30 carbon atoms which is represented by $R^5$ may be a linear or branched alkyl, and examples thereof include methyl, ethyl, propyl, isopropyl, butyl, sec-butyl, tert-butyl, pentyl, tert-pentyl, hexyl, heptyl, octyl, nonyl, decyl, undecyl, dodecyl, tridecyl, tetradecyl, pentadecyl, hexadecyl, heptadecyl, octadecyl and behenyl.

Specific examples of the benzoate compound represented by the Formula (2) include the following Compounds 2-1 to 2-5. However, the present invention is not restricted thereto by any means.

Compound 2-1

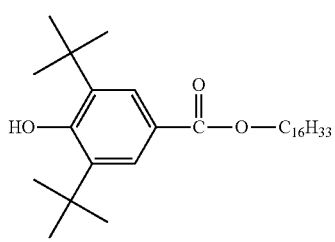

Compound 2-2

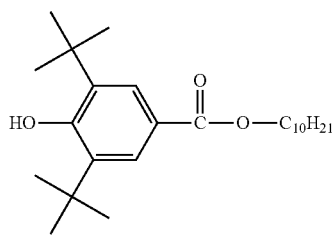

Compound 2-3

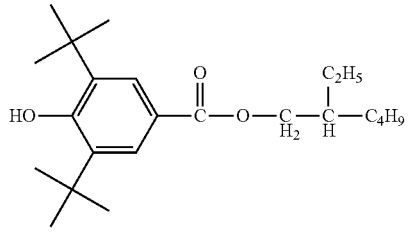

Compound 2-4

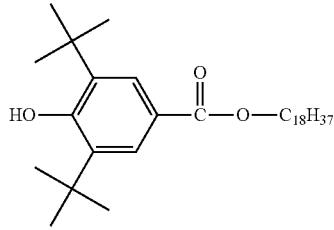

Compound 2-5

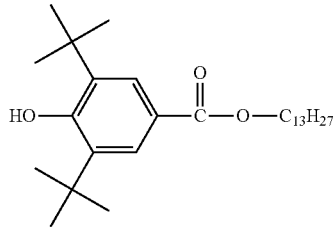

The method of synthesizing the benzoate compound represented by the Formula (2) is not particularly restricted, and the benzoate compound can be synthesized by any method that is used in ordinary organic synthesis. Further, as a purification method, for example, distillation, recrystallization, reprecipitation, or a method utilizing a filtration agent and/or an absorbent can be employed as appropriate. The above-described benzoate compound represented by the Formula (2) may be used individually, or two or more thereof may be used as a mixture.

In the present invention, the masterbatch pellet of (B) comprises the benzoate compound represented by the Formula (2) in an amount of not less than 30 parts by mass, preferably 30 to 300 parts by mass, with respect to 100 parts by mass of the polyolefin resin.

In the above-described masterbatch pellets of (A) and (B), a metal salt selected from the group consisting of metal salts of organic phosphinic acids, organic phosphonic acids, organic carboxylic acids, organic sulfuric acids, organic sulfonic acids and organic thiosulfuric acids, particularly a ring structure-containing metal organic carboxylate or metal organophosphate, is preferably incorporated because good productivity of the masterbatches can be attained.

The metal of the above-described metal organophosphate is selected from the group consisting of lithium, sodium, potassium, calcium, magnesium, barium, manganese, iron, nickel, copper, silver, zinc, aluminum and strontium.

In the mixed pellet of the present invention, it is preferred that one or both of the above-described masterbatch pellets of (A) and (B) further comprise at least one aromatic metal phosphate represented by the following Formula (3). In this case, it is preferred that the amount of the aromatic metal phosphate(s) contained in the respective masterbatch pellets of (A) and (B) be 0.3 to 5 parts by mass with respect to 100 parts by mass of the polyolefin resin.

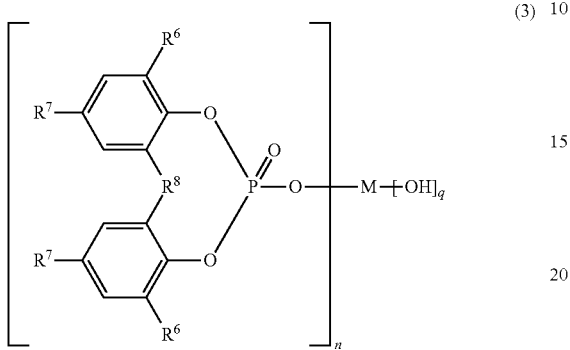

(3)

(wherein, $R^6$ represents an alkyl group having 4 to 8 carbon atoms; $R^7$ represents a hydrogen atom or an alkyl group having 1 to 8 carbon atoms; $R^8$ represents an alkylidene group having 1 to 4 carbon atoms; M represents an alkali metal an alkaline earth metal or aluminum; when M is an alkali metal, n is 1 and q is 0; when M is an alkaline earth metal, n is 2 and q is 0; and, when M is aluminum, n is 1 or 2 and q represents (3-n)).

Examples of the alkyl group having 4 to 8 carbon atoms which is represented by $R^6$ in the Formula (3) include butyl, isobutyl, sec-butyl, tert-butyl, pentyl, tert-pentyl, hexyl, heptyl, octyl, isooctyl and tert-octyl.

Examples of the alkyl group having 1 to 8 carbon atoms which is represented by $R^7$ in the Formula (3) include methyl, ethyl, propyl, isopropyl, butyl, isobutyl, sec-butyl, tert-butyl, pentyl, tert-pentyl, hexyl, heptyl, octyl, isooctyl and tert-octyl.

Examples of the alkylidene group having 1 to 4 carbon atoms which is represented by $R^8$ in the Formula (3) include methylene, ethylidene, 1,1-propylidene, 2,2-propylidene and butylidene.

Examples of the metal represented by M in the Formula (3) include alkali metals such as lithium, sodium and potassium; alkaline earth metals such as magnesium and calcium; and aluminum. Thereamong, an alkali metal is preferred.

Specific examples of the compound represented by the Formula (3) include the following Compounds 3-1 to 3-18. However, the present invention is not restricted thereto by any means.

Compound 3-1

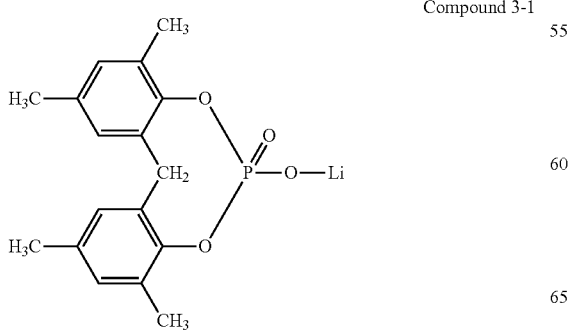

Compound 3-2

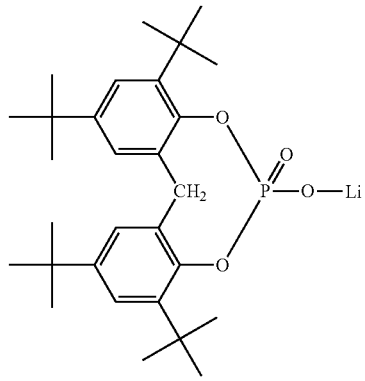

Compound 3-3

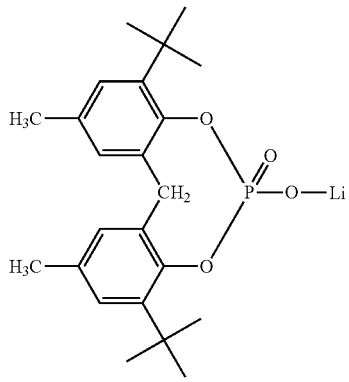

Compound 3-4

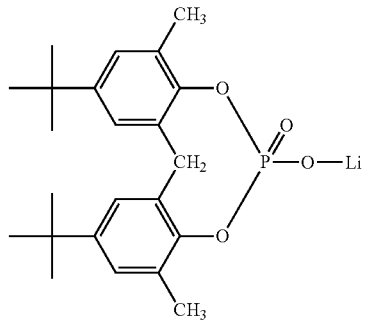

Compound 3-5

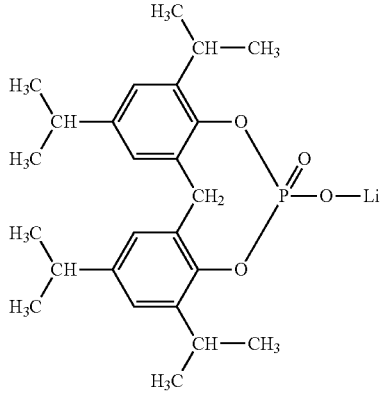

-continued
Compound 3-6
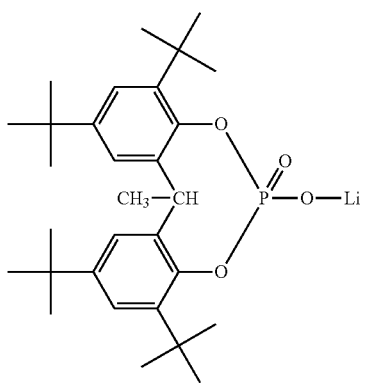
Compound 3-10
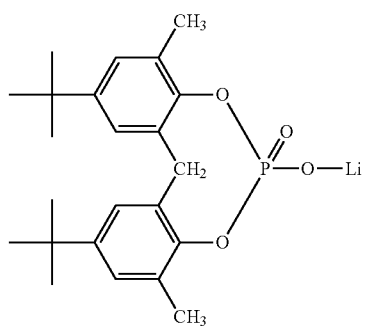
Compound 3-7
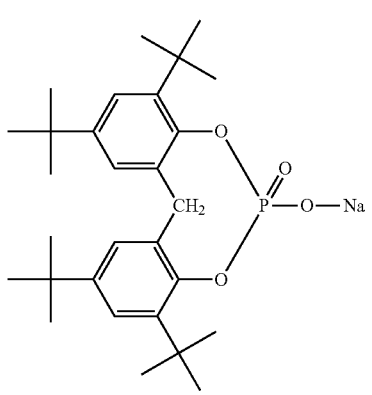
Compound 3-11
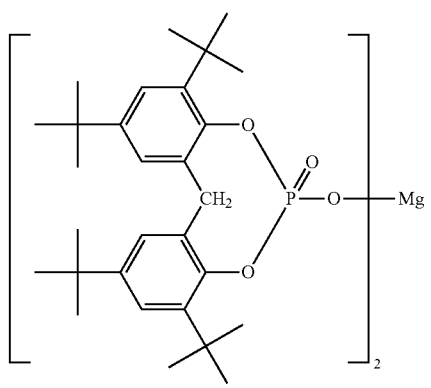
Compound 3-8
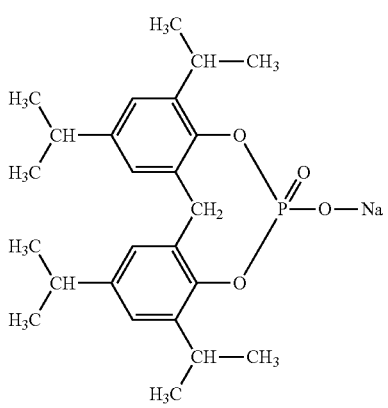
Compound 3-12
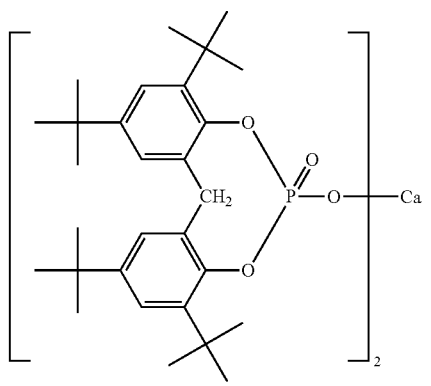
Compound 3-9
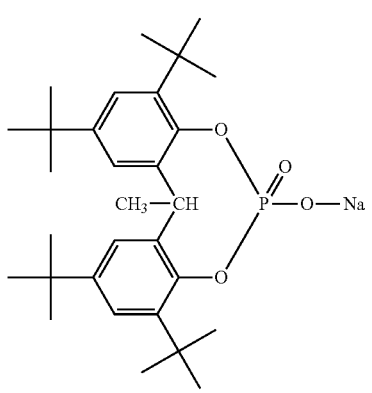
Compound 3-13
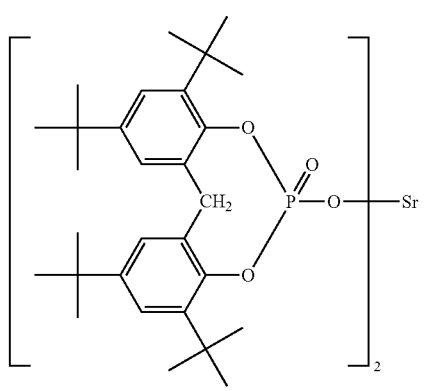

Compound 3-14

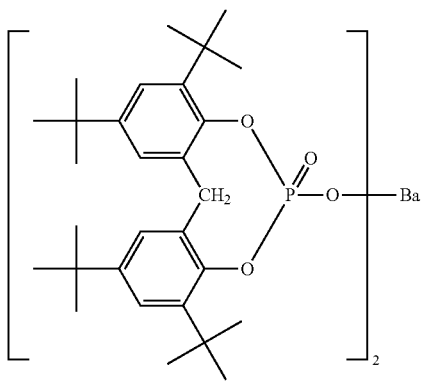

Compound 3-18

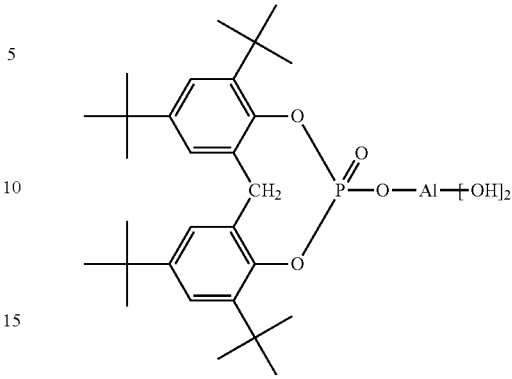

Compound 3-15

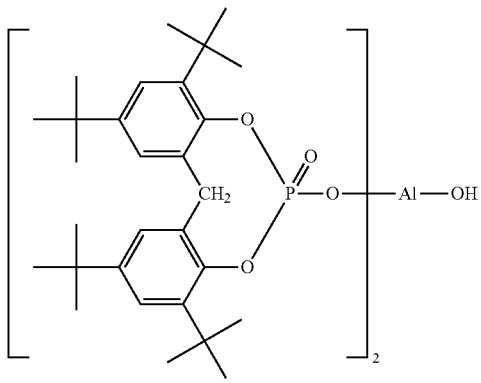

Compound 3-16

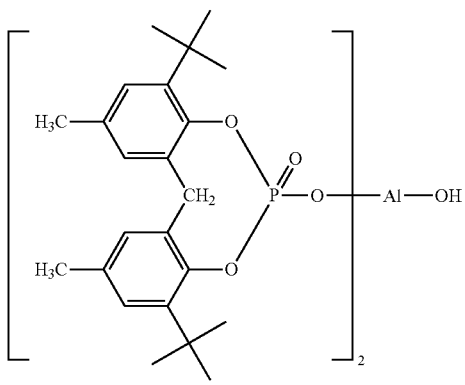

Compound 3-17

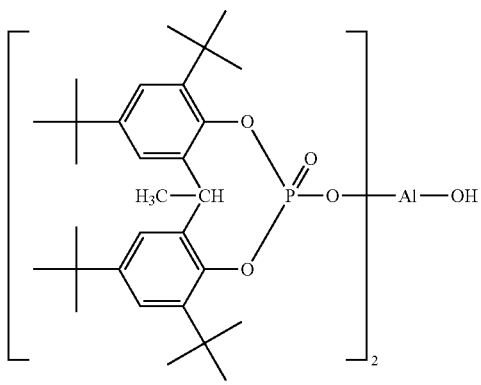

In cases where the aromatic metal phosphate represented by the Formula (3) is incorporated, it is preferably blended in an amount of 0.3 to 5 parts by mass with respect to 100 parts by mass of the polyolefin resin. When the amount of the aromatic metal phosphate is less than 0.3 parts by mass, its effect may not be exerted sufficiently, while when the amount is greater than 5 parts by mass, the aromatic metal phosphate may affect the crystallinity and the like of the resin to which the mixed pellet of the present invention is added, causing reduction in the resin physical properties.

The method of producing the mixed pellet of the present invention is not particularly restricted, and the mixed pellet of the present invention can be produced by a conventionally known method. For example, a method where the masterbatches of (A) and (B), which are each obtained by dry-blending the components to be incorporated, mixing the resultant using a Henschel mixer, a mill roll, a Banbury mixer, a super mixer or the like, kneading the resulting mixture using an uniaxial or biaxial extruder or the like and then pelletizing the kneading product, are blended can be employed. In this case, the term "blend" means to simply combine the masterbatch pellets of (A) and (B) without melt-kneading. The mixing ratio of the masterbatch pellet of (A) and the masterbatch pellet of (B) is not particularly restricted; however, it is preferably (A):(B)=1:1 to 4:1, in terms of mass ratio. Further, in the mixed pellet of the present invention, the masterbatch pellets of (A) and (B) constitute not less than 70% by mass, preferably not less than 80% by mass, of the whole mixed pellet. When the content of the masterbatch pellets of (A) and (B) is less than 70% by mass, the effects of the present invention cannot be attained. The whole pellet may be composed of either of the above-described (A) and (B), or the mixed pellet may also contain other pellet, for example, a pellet containing the below-described additive(s) and formulation agent(s) that are normally used.

Examples of a resin to be stabilized by the mixed pellet of the present invention may be any type of resin, and examples thereof include: thermoplastic resins such as polypropylenes, low-density polyethylenes, linear low-density polyethylenes, high-density polyethylenes, polybutene-1, poly-3-methyl-pentenes, poly-4-methylpentenes, α-olefin homopolymers and copolymers (e.g., ethylene-propylene copolymers), poly-unsaturated compound of these α-olefins and conjugated diene, unconjugated diene or the like, copolymers containing acrylic acid, methacrylic acid, vinyl acetate or the like, linear polyesters and acid-modified polyesters (e.g., polyethylene terephthalate, polyethylene terephthalate-isophthalate, polyethylene terephthalate-paraoxybenzoate, and polybutylene terephthalate), biodegradable resins (e.g., aliphatic polyester), liquid-crystal polyesters, polyamides (e.g., polycaprolactam and polyhexamethylene adipamide), liquid-crystal polyamides, polyimides, polystyrenes, copolymers (e.g., acrylonitrile-styrene copolymer (AS) resins, acrylonitrile-butadiene-styrene copolymer (ABS) resins, methyl methacrylate-butadiene-styrene copolymer (MBS) resins, and heat-resistant ABS resins) composed of styrene and/or α-methylstyrene with other monomer (e.g., maleic anhydride, phenyl maleimide, methyl methacrylate, butadiene or acrylonitrile), halogen-containing resins (e.g., polyvinyl chlorides, polyvinylidene chlorides, chlorinated polyethylenes, chlorinated polypropylenes, polyvinylidene fluorides, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers, and vinyl chloride-cyclohexylmaleimide copolymers), (meth)acrylate polymers (e.g., methyl(meth)acrylate, ethyl(meth)acrylate and octyl(meth)acrylate), polyether ketones, polyvinyl acetates, polyvinyl formals, polyvinyl butyrals, polyvinyl alcohols, linear and branched polycarbonates, petroleum resins, coumarone resins, polyphenylene oxides, polyphenylene sulfides, thermoplastic polyurethanes, and cellulose-based resins; thermosetting resins such as epoxy resins, phenol resins, urea resins, melamine resins, unsaturated polyester resins, and thermosetting polyurethanes; naturally-occurring resins such as natural rubbers, microorganism-produced aliphatic polyesters (e.g., 3-hydroxybutyrate), microorganism-produced aliphatic polyamides, starch, cellulose, chitin/chitosan, and gluten/gelatin; general-purpose resins; engineering resins; and polymer alloys. The term "polymer alloy" used herein refers to a multi-component polymer system which may be a block polymer obtained by copolymerization or a polymer blend obtained by mixing or the like.

Further, the resin may also be an elastomer or a silicon resin, for example, an isoprene rubber, a butadiene rubber, a butadiene-styrene copolymer rubber, a butadiene-acrylonitrile copolymer rubber, an acrylonitrile-butadiene-styrene copolymer rubber, a copolymer rubber of ethylene and an α-olefin such as propylene or butene-1, or a ternary copolymer rubber of ethylene-α olefin and a non-conjugated dienes such as ethylidene norbornene or cyclopentadiene, or an alloy or blend of any of these resins and/or elastomers.

The mixed pellet of the present invention can be applied to any of the above-described resins, regardless of the stereoregularity, the specific gravity, the type of polymerization catalyst, the presence/absence and the degree of removal of the polymerization catalyst, the degree of crystallization, the polymerization conditions such as temperature and pressure, the crystal type, the size of lamella crystal measured by X-ray small-angle scattering, the aspect ratio of the crystal, the solubility in an aromatic or aliphatic solvent, the solution viscosity, the melt viscosity, the average molecular weight, the degree of molecular weight distribution, the number of peaks in the molecular weight distribution, whether the copolymer thereof is a block or random copolymer, the blending ratio of each monomer or the like.

The method of blending the mixed pellet of the present invention into a resin is not particularly restricted and any known technology for blending a stabilizer into a resin can be employed. For example, a method in which a masterbatch is mixed with a resin powder or pellet using a Henschel mixer or the like and the resulting mixture is then kneaded using an extruder or the like can be employed. The type of the processing machine, the processing temperature, the post-processing cooling conditions and the like are also not particularly restricted, and it is preferred to select such conditions that allow the resulting resin to have physical properties suitable for its intended use.

When the mixed pellet of the present invention is blended into a resin, the mass ratio of the mixed pellet with respect to the resin varies depending on each of the concentration of the compound represented by the Formula (1) and that of the compound represented by the Formula (2) in the mixed pellet as well as the final concentration of the mixed pellet in the resulting resin composition; however, it is preferred that the mixed pellet be blended such that the concentration of the compound represented by the Formula (1) and that of the compound represented by the Formula (2) be each preferably 0.01 to 20 parts by mass, more preferably 0.05 to 10 parts by mass, with respect to 100 parts by mass of the resin in the resin composition in which the mixed pellet is blended.

In cases where the mixed pellet of the present invention is used for stabilization of a resin, various formulation agents generally used in the resin are used as required. The various formulation agents may be incorporated into the mixed pellet of the present invention or they may be incorporated in the resin composition to which the mixed pellet is blended, as long as they do not adversely affect the effects of the present invention. Further, these formulation agent may be the same as or different from the hindered amine compound, the benzoate compound and the aromatic metal phosphate that are used in the mixed pellet of the present invention. Examples of such formulation agents include a phenolic antioxidant, a phosphorus-based antioxidants, a thioether-based antioxidant, an ultraviolet absorber, a hindered amine compound, nucleating agent, a flame retardant, a flame retardant aid, a lubricant, a filler, a fibrous filler, a metallic soap, a hydrotalcite, an antistatic agent, a pigment and a dye.

Examples of the phenolic antioxidants include 2,6-di-t-butyl-4-ethylphenol, 2-t-butyl-4,6-dimethylphenol, styrenated phenol, 2,2'-methylene-bis(4-ethyl-6-t-butylphenol), 2,2'-thiobis-(6-t-butyl-4-methylphenol), 2,2'-thiodiethylene-bis[3-(3,5-di-t-butyl-4-hydroxyphenyl)propionate], 2-methyl-4,6-bis(octylsulfanylmethyl)phenol, 2,2'-isobutylidene-bis(4,6-dimethylphenol), isooctyl-3-(3,5-di-t-butyl-4-hydroxyphenyl)propionate, N,N'-hexane-1,6-diylbis[3-(3,5-di-t-butyl-4-hydroxyphenyl)propionamide, 2,2'-oxamide-bis[ethyl-3-(3,5-di-t-butyl-4-hydroxyphenyl)propionate], 2-ethylhexyl-3-(3',5'-di-t-butyl-4'-hydroxyphenyl)propionate, 2,2'-ethylene-bis(4,6-di-t-butylphenol), esters of 3,5-bis(1,1-dimethylethyl)-4-hydroxy-benzenepropanoic acid and C13-15 alkyl, 2,5-di-t-amylhydroquinone, hindered phenol polymer (AO.OH998, trade name; manufactured by ADEKA Palmarole SAS), 2,2'-methylene-bis[6-(1-methylcyclohexyl)-p-cresol], 2-t-butyl-6-(3-tert-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 6-[3-(3-t-butyl-4-hydroxy-5-methyl)propoxy]-2,4,8,10-tetra-t-butylbenzo[d,f][1,3,2]-dioxaphosphepin, hexamethylene-bis[3-(3,5-di-t-butyl-4-hydroxyphenyl)propionate, calcium bis[monoethyl(3,5-di-t-butyl-4-hydroxybenzyl) phosphonate, a reaction product between 5,7-bis(1,1-dimethylethyl)-3-hydroxy-2(3H)-benzofuranone and o-xylene, 2,6-di-t-butyl-4-(4,6-bis(octylthio)-1,3,5-triazine-2-ylamino) phenol, DL-a-tocophenol (vitamin E), 2,6-bis(α-methylbenzyl)-4-methylphenol, bis[3,3-bis-(4'-hydroxy-3'-t-butyl-phenyl)butyric acid]glycol ester, 2,6-di-t-butyl-p-cresol, 2,6-diphenyl-4-octadecyloxyphenol, stearyl(3,5-di-t-butyl-4-hydroxyphenyl)propionate, distearyl(3,5-di-t-butyl-4-hydroxybenzyl)phosphonate, tridecyl-3,5-di-t-butyl-4-hydroxybenzyl thioacetate, thiodiethylene-bis[(3,5-di-t- butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylene-bis(4-methyl-6-t-butylphenol), bis[3,3-bis(4-hydroxy-3-t-butylphenyl) butyric acid]glycol ester, 4,4'-butylidene-bis(2,6-di-t-butylphenol), 4,4'-butylidene-bis(6-t-butyl-3-methylphenol), 2,2'-ethylidene-bis(4,6-di-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl]terephthalate, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl] isocyanurate, tetrakis[methylene-3-(3',5'-di-t-butyl-4'-hydroxyphenyl)propionate]methane, 2-t-butyl-4-methyl-6-(2-acryloyloxy-3-t-butyl-5-methylbenzyl)phenol, 3,9-bis[2-(3-t-butyl-4-hydroxy-5-methylhydrocinnamoyloxy)-1,1-dimethylethyl]-2,4,8,10-tetraoxaspiro[5.5]undecane and triethylene glycol-bis[β-(3-t-butyl-4-hydroxy-5-methylphenyl)propionate], as well as 3-(3,5-dialkyl-4-hydroxyphenyl) propionic acid derivatives such as stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl)propionic acid amide and lauryl-3-(3,5-di-tert-butyl-4-hydroxyphenyl) propionic acid amide.

Examples of the above-described phosphorus-based antioxidant include triphenyl phosphite, diisooctyl phosphite, heptakis triphosphite, triisodecyl phosphite, diphenyl isooctyl phosphite, diisooctyl phenyl phosphite, diphenyl tridecyl phosphite, triisooctyl phosphite, trilauryl phosphite, diphenyl phosphite, tris(dipropylene glycol)phosphite, diisodecyl pentaerythritol diphosphite, dioleyl hydrogen phosphite, trilauryl trithiophosphite, bis(tridecyl)phosphite, tris(isodecyl) phosphite, tris(tridecyl)phosphite, diphenyldecyl phosphite, dinonylphenyl-bis(nonylphenyl)phosphite, poly(dipropylene glycol)phenyl phosphite, tetraphenyldipropyl glycol diphosphite, trisnonylphenyl phosphite, tris(2,4-di-t-butylphenyl)phosphite, tris(2,4-di-t-butyl-5-methylphenyl) phosphite, tris[2-tert-butyl-4-(3-t-butyl-4-hydroxy-5-methylphenylthio)-5-methylphenyl]phosphite, tridecyl phosphite, octyldiphenyl phosphite, di(decyl)monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl)pentaerythritol diphosphite, bis(2,4-di-t-butylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, bis(2,4-dicumylphenyl)pentaerythritol diphosphite, tetraphenyl-tetra(tridecyl)pentaerythritol tetraphosphite, bis(2,4-di-t-butyl-6-methylphenyl)ethyl phosphite, tetra(tridecyl) isopropylidene diphenol diphosphite, tetra(tridecyl)-4,4'-n-butylidene-bis(2-t-butyl-5-methylphenol)diphosphite, hexa (tridecyl)-1,1,3-tris(2-methyl-4-hydroxy-5-t-butylphenyl) butane triphosphite, tetrakis(2,4-di-t-butylphenyl) biphenylene diphosphonite, 9,10-dihydro-9-oxa-10-phosphaphenanthrene-10-oxide, (1-methyl-1-propanyl-3-ylidene)-tris(2-1,1-dimethylethyl)-5-methyl-4,1-phenylene) hexatridecyl phosphite, 2,2'-methylene-bis(4,6-t-butylphenyl)-2-ethylhexyl phosphite, 2,2'-methylene-bis(4,6-di-t-butylphenyl)-octadecyl phosphite, 2,2'-ethylidene-bis(4,6-di-t-butylphenyl)fluorophosphite, 4,4'-butylidene-bis(3-methyl-6-t-butylphenylditridecyl)phosphite, tris(2-[(2,4,8,10-tetrakis-t-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5]undecane, 2,4,6-tri-t-butylphenyl-2-butyl-2-ethyl-1,3-propanediol phosphite, poly-4,4'-isopropylidene diphenol C12-15 alcohol phosphite, and phosphite of 2-ethyl-2-butylpropylene glycol and 2,4,6-tri-t-butylphenol.

Examples of the above-described thioether-based antioxidant include tetrakis[methylene-3-(laurylthio)propionate] methane, bis(methyl-4-[3-n-alkyl(C12/C14)thiopropionyloxy]-5-t-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-t-butyl-m-cresol), 2,2'-thiobis(6-t-butyl-p-cresol) and distearyl disulfide.

Examples of the above-described ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy) benzoate, tetradecyl(3,5-di-tert-butyl-4-hydroxy)benzoate, hexadecyl(3,5-di-tert-butyl-4-hydroxy)benzoate, octadecyl (3,5-di-tert-butyl-4-hydroxy)benzoate and behenyl(3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and various metal salts and metal chelates, particularly salts and chelates of nickel and chromium. The above-described ultraviolet absorbers are used in an amount of 0.001 to 10 parts by mass, more preferably 0.01 to 5 parts by mass, with respect to 100 parts by mass of a resin.

Examples of the above-described hindered amine compound include 2,2,6,6-tetramethyl-4-piperidylbenzoate, bis (2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)butane tetracarboxylate, tetrakis(1,2,2,6,6-pentmethyl-4-piperidyl)butane tetracarboxylate, bis(2,2,6,6-tetramethyl-4-piperidyl).di(tridecyl)-1,2,3,4-butane tetracarboxylate, bis(1,2,2,6,6-pentamethyl-4-piperidyl).di(tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylaminoundecane and 1,6,11-tris[2,4-bis(N-butyl-N-(1,2,2,6,6-pentamethyl-4-piperidyl)amino)-s-triazine-6-ylaminoundecane.

Examples of the above-described nucleating agent include metal salts of aromatic carboxylic acids, such as aluminum p-t-butyl benzoate and sodium benzoate; metal salts of alicyclic carboxylic acids, such as disodium-bicyclo(2,2,1)heptane-2,3-dicarboxylate; acidic metal phosphates such as sodium-bis(2,4-di-tert-butylphenyl)phosphate, lithium-bis(2,4-di-tert-butylphenyl)phosphate and sodium-2,2'-methylenebis(4,6-di-tert-butylphenyl)phosphate; and polyhydric alcohol derivatives such as dibenzylidene sorbitol and bis(methylbenzylidene)sorbitol.

Examples of the above-described flame retardant include aromatic phosphates such as triphenyl phosphate, tricresyl phosphate, trixylenyl phosphate, cresyldiphenyl phosphate, cresyl-2,6-xylenyl phosphate and resorcinol-bis(diphenylphosphate); phosphonates such as divinyl phenylphosphonate, diallyl phenylphosphonate and (1-butenyl)phenylphosphonate; phosphinates such as phenyl diphenylphosphinate, methyl diphenylphosphinate and 9,10-dihydro-9-oxa-10-phosphaphenanthlene-10-oxide derivatives; phosphazene compounds such as bis(2-allylphenoxy) phosphazene and dicresylphosphazene; phosphorus-based flame retardants such as melamine phosphate, melamine pyrophosphate, melamine polyphosphate, melam polyphosphate, ammonium polyphosphate, phosphorus-containing vinylbenzyl compounds and red phosphorus; metal hydroxides such as magnesium hydroxide and aluminum hydroxide; and bromine-based flame retardants such as brominated bisphenol A-type epoxy resins, brominated phenol novolac-type epoxy resins, hexabromobenzene, pentabromotoluene, ethylenebis(pentabromophenyl), ethylenebis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate and brominated styrene.

The above-described lubricant is added for the purposes of imparting the surface of the resulting molded article with lubricity and improving the damage-preventing effect. Examples of such lubricant include unsaturated fatty acid amides such as oleic acid amide and erucic acid amide; and saturated fatty acid amides such as behenic acid amide and stearic acid amide. These lubricants may be used individually, or two or more thereof may be used in combination.

Preferred examples of the above-described filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, silica, alumina, potassium titanate whiskers, wollastonite and fibrous magnesium oxysulfate. Thereamong, fillers having an average particle size (in the case of spherical and plate-form fillers) or an average filler diameter (in the case of needle-form and fibrous fillers) of 5 μm or less are preferred.

The above-described hydrotalcite is a complex salt compound which is known as a natural or synthetic product and composed of magnesium, aluminum, hydroxyl groups, a carbonate group and arbitrary crystal water, and examples thereof include hydrotalcites in which some of the magnesium or aluminum are substituted with other metal such as an alkali metal or zinc; and hydrotalcites in which the hydroxyl group(s) and/or carbonate group is/are substituted with other anionic group, more specifically, hydrotalcites represented by the following Formula (4) in which a metal is substituted with an alkali metal. In addition, as an Al—Li hydrotalcite, a compound represented by the following Formula (5) can be used as well.

$$Mg_{x1}Zn_{x2}Al_2(OH)_{2(x1+x2)+4}(CO_3) \cdot pH_2O \quad (4)$$

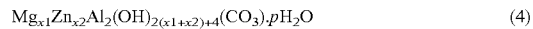

(wherein, x1 and x2 each represent a number that satisfies the conditions represented by the following equations; and p represents 0 or a positive number: $0 \leq x2/x1 < 10$, $2 \leq x1+x2 \leq 20$)

$$[Li_{1/3}Al_{2/3}(OH)_2][A^{q-}_{1/3q} \cdot pH_2O] \quad (5)$$

(wherein, $A^{q-}$ represents an anion having a valence of q; and p represents 0 or a positive number).

Further, the carbonate anion in the above-described hydrotalcites may be partially substituted with other anion.

In the above-described hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The above-described hydrotalcites may be a naturally-occurring or synthetic hydrotalcite. Examples of a method of synthesizing such a compound include known methods that are described in Japanese Patent Publication (Kokoku) No. S46-2280, Japanese Patent Publication (Kokoku) No. S50-30039, Japanese Patent Publication (Kokoku) No. S51-29129, Japanese Patent Publication (Kokoku) No. H3-36839, Japanese Unexamined Patent Application Publication No. S61-174270, Japanese Unexamined Patent Application Publication No. H5-179052 and the like. Further, the above-described hydrotalcites can be used without any restriction on its crystal structure, crystal particle and the like.

Examples of the above-described antistatic agent include cationic antistatic agents such as fatty acid quaternary ammonium ion salts and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents such as polyhydric alcohol fatty acid esters, polyglycol phosphates and polyoxyethylene alkyl allyl ethers; and amphoteric antistatic agents such as amphoteric alkyl betaines (e.g., alkyldimethylamino acetic acid betaine) and imidazoline-type amphoteric activators. These antistatic agents may be used individually, or two or more thereof may be used in combination.

Further, in cases where the mixed pellet of the present invention is used in an agricultural film, an ultraviolet absorber may be blended so as to control the crop growth; an infrared absorber may be blended so as to improve the heat-retaining properties; and/or an anti-clouding agent or an anti-fogging agent may be blended so as to prevent fogging and dew condensation in a greenhouse.

The amount of each of the above-described formulation agents to be used in the resulting resin is preferably in the range of from an amount at which an effect of adding the agent is exerted to an amount at which an improvement in the effect of the addition is no longer observed. Preferred amounts of the respective formulation agents to be used with respect to 100 parts by mass of a resin are as follows: 0.001 to 10 parts by mass of a phenolic antioxidant(s), 0.001 to 10 parts by mass of a phosphorus-based antioxidant(s), 0.001 to 10 parts by mass of a thioether-based antioxidant(s), 0.001 to 10 parts by mass of an ultraviolet absorber(s), 0.001 to 10 parts by mass of a hindered amine compound(s), 1 to 50 parts by mass of a flame retardant(s), 0.03 to 2 parts by mass of a lubricant(s), 0.03 to 2 parts by mass of a hydrotalcite(s), and 0.03 to 2 parts by mass of an antistatic agent(s). It is noted here that the above-described amounts of use indicate the final amounts of the respective agents used in a molded article obtained using the mixed pellet of the present invention, not the amounts of the respective agents blended in the mixed pellet.

The molded article of the present invention is obtained by molding a resin composition in which the above-described mixed pellet of the present invention is blended into a resin, preferably an olefin-based resin, by a known molding method such as extrusion molding, injection molding, hollow molding, blow molding or compression molding. The molded article of the present invention can be used as a food container; a cosmetic or clothing container; a bottle such as a food bottle, a beverage bottle, a cooking oil bottle or a seasoning bottle; a packaging material such as a food packaging material, a wrapping material or a transport packaging material; a sheet or a film such as a protection film of an electronic material or a protective sheet of an electric appliance; a fiber; a miscellaneous daily goods; a toy; and the like.

EXAMPLES

The present invention will now be described in more detail by way of examples thereof. However, the present invention is not restricted to the following examples.

Production Examples 1 to 3

In accordance with the amounts shown in Table 1, a homopolypropylene (melt flow rate (MFR)=11 g/10 min), an aromatic metal phosphate (Compound 3-7; manufactured by ADEKA Corporation, trade name: ADK STAB NA-11) and a hindered amine compound (a mixture of Compounds 1-1 and 1-2; manufactured by ADEKA Corporation, trade name: ADK STAB LA-40) were added and mixed for 1 minute using a Henschel mixer. Then, using a biaxial extruder (TEX30α, manufactured by The Japan Steel Works LTD), the resulting mixture was extruded at a temperature of 200° C. and a die temperature of 170° C. into the form of a strand having a diameter of 3 mm, and this strand was cut at a length of 3 mm to produce a masterbatch pellet. It is noted here that the units of all numerical values shown in Table 1 are parts by mass.

Production Examples 4 to 6

In accordance with the amounts shown in Table 1, a homopolypropylene (MFR=11 g/10 min), an aromatic metal phosphate (Compound 3-7; manufactured by ADEKA Corporation, trade name: ADK STAB NA-11) and a benzoate compound (Compound 2-1) were added and mixed for 1 minute using a Henschel mixer. Then, using a biaxial extruder (TEX30α, manufactured by The Japan Steel Works LTD), the resulting mixture was extruded at a temperature of 200° C. and a die temperature of 170° C. into the form of a strand having a diameter of 3 mm, and this strand was cut at a length of 3 mm to produce a masterbatch pellet.

Production Examples 7 to 9

In accordance with the amounts shown in Table 1, a homopolypropylene ((MFR)=11 g/10 min), an aromatic metal phosphate (Compound 3-7; manufactured by ADEKA Corporation, trade name: ADK STAB NA-11), a hindered amine compound (a mixture of Compounds 1-1 and 1-2; manufactured by ADEKA Corporation, trade name: ADK STAB LA-40) and a benzoate compound (Compound 2-1) were added and mixed for 1 minute using a Henschel mixer. Then, using a biaxial extruder (TEX30α, manufactured by The Japan Steel Works LTD), the resulting mixture was extruded at a temperature of 200° C. and a die temperature of 170° C. into the form of a strand having a diameter of 3 mm, and this strand was cut at a length of 3 mm to produce a masterbatch pellet.

TABLE 1

| Production Example | Polypropylene | Aromatic metal phosphate: Compound 3-7 | Hindered amine compound: ADK STAB LA-40 | Benzoate compound: Compound 2-1 |
|---|---|---|---|---|
| Production Example 1 | 100 | 1.5 | 100 | — |
| Production Example 2 | 100 | 1.5 | 80 | — |
| Production Example 3 | 100 | 1.5 | 50 | — |
| Production Example 4 | 100 | 1.5 | — | 50 |
| Production Example 5 | 100 | 1.5 | — | 80 |
| Production Example 6 | 100 | 1.5 | — | 100 |
| Production Example 7 | 100 | 1.5 | 70 | 30 |
| Production Example 8 | 100 | 1.5 | 50 | 50 |
| Production Example 9 | 100 | 1.5 | 30 | 70 |

Next, the masterbatches produced in the above-described Production Examples 1 to 9 were mixed in accordance with the formulations shown in Table 2, and the resultants were each subjected to the following evaluation. The results thereof are shown in Table 2 below.

(Evaluation of Blocking Resistance)

In a glass sample vial having a base area of 12.6 cm$^2$, a height of 6 cm and a volume of 75 ml, 20 g of each masterbatch obtained by the above-described method was placed. The vial was tightly sealed and left to stand in a 50° C. incubator for 24 hours, in a 5° C. incubator for 12 hours and in a 25° C. incubator for 3 hours in the order mentioned. Then, the sample vial was gently inverted and the blocking resistance was evaluated based on the falling condition of the masterbatch. The evaluation criteria were as follows. Level 1 stands for the most excellent blocking resistance, followed by Levels 2, 3 and 4, with Level 5 being an evaluation given to the poorest blocking resistance.

Level 1: The masterbatch fell in the sample vial when the sample vial was gently inverted.

Level 2: The masterbatch did not fall under the condition of Level 1; however, when vibration was given to the inverted sample vial by dropping it onto a flat bench from a height of 5 mm, the masterbatch fell.

Level 3: The masterbatch did not fall under the condition of Level 2; however, when vibration was given to the inverted sample vial by dropping it onto a flat bench from a height of 30 mm, the masterbatch fell.

Level 4: The masterbatch did not fall under the condition of Level 3; however, the masterbatch fell when the sample vial was shaken vertically several times.

Level 5: The masterbatch did not fall even under the condition of Level 4.

From the results of Comparative Examples 1 to 6, those masterbatch pellets that were produced by a method other than the production method of the present invention were confirmed to have poor blocking resistance. On the other hand, from the results of Examples 1 to 9, it was confirmed that the mixed pellets of masterbatches obtained by the production method of the present invention can attain excellent blocking resistance.

Furthermore, from the results of Reference Examples 1 to 3, since the problem of blocking caused by storage under a high-temperature environment was not observed in the masterbatches containing no hindered amine compound, it is seen that blocking is caused by a hindered amine compound. The masterbatches of Examples 1 to 9 showed excellent blocking resistance despite containing a hindered amine compound.

The invention claimed is:

1. A pellet mixture, comprising a mixture of (A) a masterbatch pellet that comprises not less than 30 parts by mass of a hindered amine compound represented by Formula (1) with respect to 100 parts by mass of a polyolefin and without a benzoate compound represented by Formula (2); and (B) a masterbatch pellet that comprises not less than 30 parts by mass of the benzoate compound represented by Formula (2) with respect to 100 parts by mass of a polyolefin and without the hindered amine compound represented by Formula (1); wherein not less than 70% by mass thereof as a whole is composed of said masterbatch pellets of (A) and (B);

TABLE 2

| | Masterbatch pellet (mass ratio) | Mixed pellet (parts by mass) | | | | Blocking resistance |
|---|---|---|---|---|---|---|
| | | Polypropylene | Compound 3-7 | ADK STAB LA-40 | Compound 2-1 | |
| Example 1 | Production Example 1:Production Example 4 = 1:1 | 100 | 1.5 | 50 | 25 | Level 1 |
| Example 2 | Production Example 1:Production Example 4 = 2:1 | 100 | 1.5 | 66.7 | 16.7 | Level 1 |
| Example 3 | Production Example 1:Production Example 4 = 1:2 | 100 | 1.5 | 33.3 | 33.3 | Level 1 |
| Example 4 | Production Example 2:Production Example 5 = 1:1 | 100 | 1.5 | 40 | 40 | Level 1 |
| Example 5 | Production Example 2:Production Example 5 = 2:1 | 100 | 1.5 | 53.3 | 26.7 | Level 1 |
| Example 6 | Production Example 2:Production Example 5 = 1:2 | 100 | 1.5 | 26.7 | 53.3 | Level 1 |
| Example 7 | Production Example 3:Production Example 6 = 1:1 | 100 | 1.5 | 25 | 50 | Level 1 |
| Example 8 | Production Example 3: Production Example 6 = 2:1 | 100 | 1.5 | 33.3 | 33.3 | Level 1 |
| Example 9 | Production Example 3:Production Example 6 = 1:2 | 100 | 1.5 | 16.7 | 66.7 | Level 1 |
| Comparative Example 1 | only Production Example 1 | 100 | 1.5 | 100 | — | Level 5 |
| Comparative Example 2 | only Production Example 2 | 100 | 1.5 | 80 | — | Level 5 |
| Comparative Example 3 | only Production Example 3 | 100 | 1.5 | 50 | — | Level 5 |
| Comparative Example 4 | only Production Example 7 | 100 | 1.5 | 70 | 30 | Level 5 |
| Comparative Example 5 | only Production Example 8 | 100 | 1.5 | 50 | 50 | Level 5 |
| Comparative Example 6 | only Production Example 9 | 100 | 1.5 | 30 | 70 | Level 5 |
| Reference Example 1 | only Production Example 4 | 100 | 1.5 | — | 50 | Level 1 |
| Reference Example 2 | only Production Example 5 | 100 | 1.5 | — | 80 | Level 1 |
| Reference Example 3 | only Production Example 6 | 100 | 1.5 | — | 100 | Level 1 |

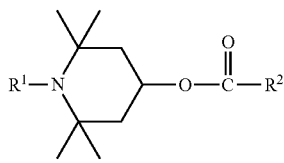

(1)

wherein $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms or an alkenyl group having 2 to 30 carbon atoms;

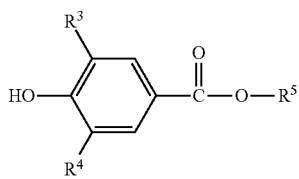

(2)

wherein $R^3$ and $R^4$ each independently represent a hydrogen atom, an alkyl group having 1 to 12 carbon atoms, or an arylalkyl group having 7 to 30 carbon atoms; and $R^5$ represents an alkyl group having 1 to 30 carbon atoms.

2. The pellet mixture according to claim 1, wherein the content of said hindered amine compound and said benzoate compound is 30 to 60% by mass with respect to the whole mixed pellet.

3. The pellet mixture according to claim 1, wherein one or both of said masterbatch pellets of (A) and (B) comprise at least one aromatic metal phosphate represented by Formula (3); wherein the content of said aromatic metal phosphate(s) in each of said masterbatch pellets of (A) and/or (B) is 0.3 to 5 parts by mass with respect to 100 parts by mass of said polyolefin resin;

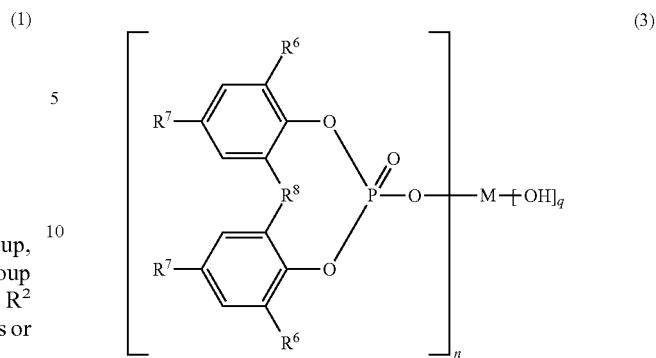

(3)

wherein $R^6$ represents an alkyl group having 4 to 8 carbon atoms; $R^7$ represents a hydrogen atom or an alkyl group having 1 to 8 carbon atoms; $R^8$ represents an alkylidene group having 1 to 4 carbon atoms; M represents an alkali metal, an alkaline earth metal or aluminum; when M is an alkali metal, n is 1 and q is 0; when M is an alkaline earth metal, n is 2 and q is 0; and, when M is aluminum, n is 1 or 2 and q represents (3-n).

4. A polyolefin resin composition, comprising the pellet mixture according to claim 1 in a polyolefin resin.

5. A molded article, obtained by molding the polyolefin resin composition according to claim 4.

6. The pellet mixture according to claim 1, wherein a mixing ratio of the masterbatch pellet of (A) and the masterbatch pellet of (B) is (A):(B)=1:1 to 4:1 by mass.

7. The pellet mixture according to claim 3, wherein said masterbatch pellets of (A) comprise at least one aromatic metal phosphate represented by Formula (3).

8. The pellet mixture according to claim 3, wherein said masterbatch pellets of (B) comprise at least one aromatic metal phosphate represented by Formula (3).

9. The pellet mixture according to claim 4, wherein the polyolefin resin is a polypropylene.

10. A method for producing the pellet mixture according to claim 1, comprising the steps of separately producing the masterbatch pellet of (A) and the masterbatch pellet of (B) and then mixing the masterbatch pellet of (A) and masterbatch pellet of (B).

* * * * *